Jan. 12, 1943.  J. L. DRAKE  2,308,062
APPARATUS FOR TEMPERING GLASS
Original Filed June 2, 1938

Inventor
JOHN L. DRAKE.

By Frank Fraser
Attorney

Patented Jan. 12, 1943

2,308,062

UNITED STATES PATENT OFFICE 2,308,062

APPARATUS FOR TEMPERING GLASS

John L. Drake, Toledo, Ohio, assignor to Libbey-Owens-Ford Glass Company, Toledo, Ohio, a corporation of Ohio Original application June 2, 1938, Serial No. 211,343. Divided and this application November 23, 1940, Serial No. 366,857

6 Claims. (Cl. 49—1)

The present invention relates broadly to the art of tempering glass and more particularly to an improved apparatus for producing bent tempered sheets or plates of glass of predetermined curvature.

This application is a division of my copending application filed June 2, 1938, Serial No. 211,343, entitled "Apparatus for tempering glass," now Patent No. 2,247,118 dated June 24, 1941.

When tempering glass sheets, according to one well known process, the sheets are first heated to approximately the point of softening of the glass and then suddenly chilled to place the outer surfaces of said sheets under compression and the interiors thereof under tension. The treatment of glass sheets in this manner not only materially increases the mechanical strength of the glass, but further modifies its breaking characteristics so that, when broken, the glass will disintegrate into innumerable small and relatively harmless particles instead of breaking into large dangerous pieces or slivers as is the case with ordinary glass.

In the practice of the above process, the glass sheet is ordinarily maintained in a vertical position during the treatment thereof and it is customary to suspend the sheet from a plurality of relatively small tongs or hooks which engage the same near its upper edge. The glass sheet is first heated to the desired temperature in a suitable furnace and upon removal therefrom is subjected immediately to the action of suitable cooling devices by which the glass is suddenly chilled. These cooling devices usually comprise spaced blower heads between which the highly heated glass sheet is received and which serve to direct jets of air upon opposite surfaces of the said sheet simultaneously.

It has also been proposed to produce bent or curved sheets or plates of glass by the above process, but the suspending of the bent sheets in a vertical position by means of tongs is, however, not entirely satisfactory due to the fact that the tongs tend to bite into the glass upon the softening thereof, causing slight indentations or depressions which remain therein after tempering and which tend to mar the appearance of the sheets. Further, if the glass sheets are not properly hung from the tongs, they are very apt to become warped or distorted upon being heated to the point of softening of the glass. Also, the penetration of the tong causes a definite weakness in the outer surface skins of the glass sheets, resulting in a tendency toward spontaneous fracture thereof The marring of the glass sheets by the tongs would not be so objectionable were it possible to trim the sheets after tempering, but glass so tempered cannot be subsequently cut without causing the complete shattering thereof.

Generally speaking, it is the aim of this invention to produce curved or bent sheets or plates of tempered glass by the process described above of first heating the sheets to approximately the point of softening of the glass and then suddenly chilling the same. However, according to the present invention, the glass sheets are adapted to be bent and tempered while maintained in a substantially horizontal position, thereby eliminating the use of tongs or other supporting means which might tend to mar or injure the surface of the glass, the bending and tempering operations being effected with a minimum amount of handling of the glass sheets so as to greatly lessen the liability of warpage or distortion of the glass surfaces during treatment The glass sheets are adapted to be successively heated to the desired temperature, bent to a predetermined curvature, and then suddenly cooled to complete the tempering thereof as the said sheets are carried forwardly to the end that the bending and tempering operations are carried out in a substantially continuous manner, with less liability of breakage of the glass as well as a reduced tendency toward marring of the glass surfaces.

Other objects and advantages of the invention will become more apparent during the course of the following description when taken in connection with the accompanying drawing.

In the drawing wherein like numerals are employed to designate like parts throughout the same:

Figure 1:
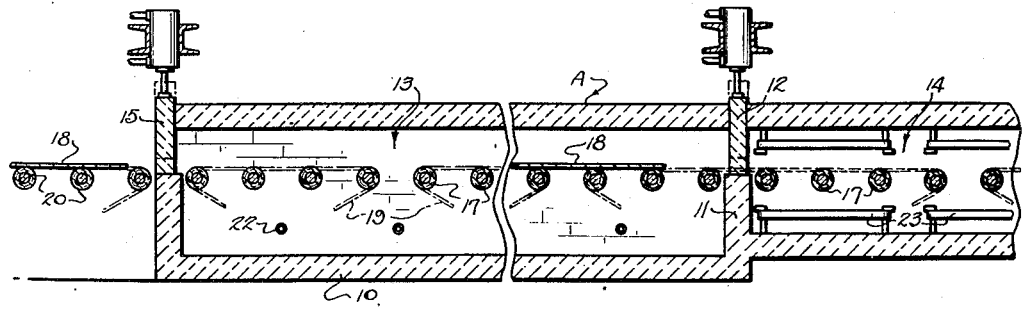
Fig. 1 is a vertical longitudinal sectional view through the furnace employed for heating the glass sheets.

With reference now to the drawing, the letter A designates in its entirety the means for heating the glass sheets; B the means for bending the heated sheets to the desired curvature; and C the means for subsequently cooling the bent sheets to complete the tempering thereof, said heating, bending, and cooling means being so associated with one another that the glass sheets can be passed directly from the heating means to the bending means and thence to the cooling means rapidly and conveniently and with a minimum loss of heat and exposure to the atmosphere, whereby the sheets will be acted upon by the cooling means while still in a uniformly heated condition.

The heating means A comprises an elongated furnace structure 10 substantially rectangular in cross section and divided transversely at a point intermediate its ends by a vertical partition wall 11 and vertically movable gate 12 into a preliminary heating section 13 and a final heating section 14. The entrance and exit ends of the furnace are also adapted to be closed by vertically movable gates 15 and 16 respectively. Arranged throughout the entire length of the furnace structure is a series of horizontally aligned conveyor rolls 17 for carrying the glass sheets 18 to be treated therethrough. It is preferred that these rolls be divided into a plurality of separate conveyor sections, each being driven by a chain and sprocket drive or the like 19, and that the speed of rotation of said separate conveyor sections be independently controllable. Arranged at the forward end of the furnace, exteriorly thereof, is a series of rolls 20 for intially receiving the sheets to be treated and for feeding them into the furnace, while arranged at the opposite end of said furnace are a plurality of rolls 21 for receiving the heated sheets therefrom and delivering them to the bending means B.

The primary heating section 13 of the furnace is preferably heated with gas supplied thereto through burners 22, while the final heating section 14 is preferably electrically heated by means of the electric heating elements 23 disposed above and beneath the path of travel of the glass. These electric heating elements or resistors may be connected in series or parallel and may be controlled in the usual manner by necessary switches and rheostats.

In the tempering of the glass sheets, they are heated to approximately the point of softening of the glass which is ordinarily in the neighborhood of 1250 degrees Fahrenheit for flat glass and the sheets are adapted to be gradually brought to this temperature during their travel through the furnace 10. There is a decided advantage to be gained in dividing the furnace into a primary heating section and a final heating section and in heating the former with gas and the latter by electricity. For instance, it is well known that gas is a relatively cheaper fuel than electricity and therefore the cheap fuel is used for the primary heating of the glass, while the more expensive electric heat is used only for the final finishing heat. The glass sheets may be heated as they travel through the primary heating section 13 to approximately 1000 to 1100 degrees Fahrenheit, and in their passage through the final heating section 14 may be brought from this temperature to a temperature of 1250 degrees Fahrenheit. While gas is cheaper than electricity, yet it is also a well known fact that electricity produces a more uniform and constant heat than any of the other forms of heating. Consequently, during their travel through the final heating section, the glass sheets will be evenly and uniformly heated to the desired predetermined temperature. Although not so illustrated in the drawing, the conveying rolls 17 in the final heating section 14 may, if desired, be arranged relatively closer together than the rolls in the primary heating section 13 to prevent sagging of the softened glass therebetween.

As the highly heated glass sheet 18 emerges from the exit end of the furnace, it is adapted to be passed directly to the bending means B. The bending and cooling means B and C are superimposed, with said bending means being located above said cooling means in substantial horizontal alignment with the exit end of the furnace 10 and adapted to receive the heated glass sheets from the rolls 21.

The bending means B comprises an arcuately shaped bending member 24 provided with end portions 25 and 26, said end portions being carried by a horizontal shaft 27 journaled in its opposite ends in bearings 28 mounted upon fixed supports 29. The radius of curvature of the bending member 24 corresponds to the curvature to be given the glass sheet. The shaft 27 is adapted to be rotated to effect rocking or oscillating movement of the bending member 24 from a worm 30 keyed to a shaft 31 journaled in bearings 32 and meshing with a worm gear 33 fixed to the shaft 27. Associated with the bending member 24 and cooperating therewith to bend the glass sheet to the desired curvature are a plurality of bending rolls 34 arranged with respect to one another to conform to the curvature of the outer surface of bending member 24.

Figure 2:
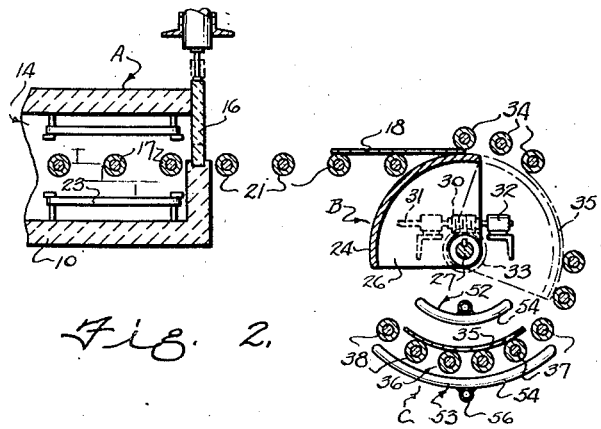
Fig. 2 represents a continuation of Fig. 1 and illustrates in section the means for bending the heated glass sheets as they emerge from the furnace, and in side elevation the means for cooling the bent sheets.
Figure 3:
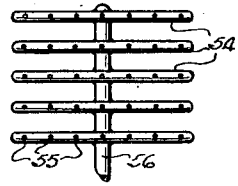
Fig. 3 is a plan view of a portion of the cooling means.
Figure 4:
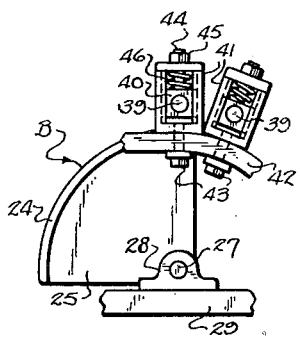
Fig. 4 is a side elevation of the bending means.
Figure 5:
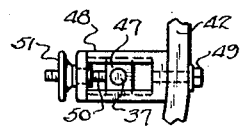
Fig. 5 shows the means for mounting one of the sheet guiding rolls.

When the glass sheet 10 passes over the rolls 21 to the bending means B, the bending member 24 is adapted to be disposed in the position shown in full lines in Fig. 2. As soon as the forward end of the glass sheet passes between the bending member 24 and first bending roll 34, the said bending member is rocked upon shaft 27 in a clockwise direction to carry the glass sheet beneath the bending rolls 34 which cooperate with said bending member 24 to bend the glass sheet about the curved outer surface thereof. When the bending member reaches the broken line position in Fig. 2 and the bent sheet of glass 35 passes from beneath the last bending roll 34, the said bending member is adapted to be rotated in a counter-clockwise direction to return it to starting position and when this is done, the sheet 35 is adapted to slide downwardly by gravity off the bending member and onto the curved roller support or cradle 36 having a curvature substantially corresponding to that of the bent sheet. The roller support 36 consists of a plurality of horizontal shafts 37, each carrying a series of relatively short discs 38.

The bending rolls 34 are carried by shafts 39 journaled at their opposite ends in bearing blocks 40 slidable vertically in standards 41 which are secured to supporting members 42 by screws or the like 43. The bearing blocks 40 are carried by bolts 44 which pass upwardly through the upper ends of the standards 41 and have nuts 45 threaded upon the outer ends thereof. The rolls 34 are yieldably urged toward the bending member 24 by compression springs 46 which encircle the said bolts 44.

Each of the shafts 37 of the roller support 36 can also be mounted at their opposite ends in bearing blocks 47 slidably mounted in standards 48 secured to the supports 42 by screws or the like 49. The bearing blocks 47 have secured thereto the inner ends of bolts 50 which pass outwardly through the standards and carry nuts 51 by means of which the said shafts 37 can be moved inwardly or outwardly.

The curved sheet of glass 35 is adapted to be cooled while supported upon the discs 38 of roller support 36, and the cooling means C comprises cooling devices 52 and 53 arranged above and beneath the sheet. Each of these cooling devices may consist of a plurality of spaced parallel pipes 54 curved longitudinally to conform substantially to the curvature of the glass sheet 35 and being provided with a series of outlets 55. The pipes 54 are carried by and communicate with a supply pipe 56, by means of which the said cooling devices can also be supported. When the bent glass sheet 35 is brought to rest upon the discs 38, the cooling devices 52 and 53 are placed in operation to direct jets or blasts of air against opposite surfaces of the glass sheet simultaneously to effect the desired cooling thereof and thereby complete the tempering of the glass. Due to the provision of the discs 38 on shafts 37, the air from the lower blower head will be permitted to pass upwardly between said discs and impinge upon the bottom surface of the sheet.

From the above, it will be apparent that the apparatus disclosed is substantially continuous in that the glass sheet is passed successively through the furnace A and bending means B to the cooling means C without any necessity for manual handling of the glass. As a result, the handling of the glass is reduced to a minimum, thereby greatly lessening the liability of warpage or distortion of the glass surfaces during treatment. Likewise, with the apparatus herein disclosed, the use of tongs or other supporting means which tend to mar or disfigure the sheet is eliminated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination in apparatus for making bent tempered glass sheets including, bending means and cooling means adapted to successively receive the glass sheet and being superimposed respectively one above the other, said bending means including a pivotally mounted member having an arcuately curved bending surface for receiving the heated sheet thereon and a plurality of bending rolls cooperating with said member to effect the bending of the sheet about the curved bending surface thereof, and means for receiving the bent sheet from said bending means and supporting it in position to be acted upon by said cooling means.

2. In combination in apparatus for making bent tempered glass sheets including, bending means for receiving a sheet heated to the desired temperature comprising a pivotally mounted member having an arcuately curved bending surface and a plurality of bending rolls cooperating with said member to effect the bending of the sheet about said curved bending surface, superimposed cooling devices arranged beneath said bending means and adapted to receive the bent sheet horizontally therebetween from said bending means and to effect the simultaneous cooling of the opposite surfaces thereof, and means for supporting the bent sheet horizontally between said cooling devices to be acted upon thereby.

3. Apparatus for bending glass sheets including a pivotally mounted member having an arcuately curved bending surface for receiving a sheet heated to the desired temperature thereon, a plurality of bending rolls cooperating with said member to effect the bending of the sheet about the curved bending surface thereof, superimposed cooling devices arranged beneath said member and adapted to receive the bent sheet horizontally therebetween from said member and to effect the simultaneous cooling of the opposite surfaces thereof, and a roller support positioned between said cooling devices for supporting the bent sheet while being acted upon by the said cooling devices.

4. In combination in apparatus for making bent tempered glass sheets including bending means and cooling means adapted to successively receive the glass sheet and being superimposed respectively one above the other, said bending means including a rotatably mounted member having a curved bending surface for receiving a sheet heated to the desired temperature thereon and means cooperating with said member to effect the bending of the sheet about the curved bending surface thereof, and means for receiving the bent sheet from said bending means and supporting it in position to be acted upon by said cooling means.

5. In combination in apparatus for making bent tempered glass sheets including bending means for receiving a sheet heated to the desired temperature comprising a rotatably mounted member having a curved bending surface and means cooperating with said member to effect the bending of the sheet about said curved bending surface, superimposed cooling devices arranged beneath said bending means and adapted to receive the bent sheet horizontally therebetween from said bending means and to effect the simultaneous cooling of the opposite surfaces thereof, and means for supporting the bent sheet horizontally between said cooling devices to be acted upon thereby.

6. Apparatus for bending glass sheets including a rotatably mounted member having a curved bending surface for receiving a sheet heated to the desired temperature thereon, means cooperating with said member to effect the bending of the sheet about the curved bending surface thereof, superimposed cooling devices arranged beneath said member and adapted to receive the bent sheet horizontally therebetween from said member and to effect the simultaneous cooling of the opposite surfaces thereof, and a roller support positioned between said cooling devices for supporting the bent sheet while being acted upon by the said cooling devices.

JOHN L. DRAKE.